(12) United States Patent
Nobuhira

(10) Patent No.: US 7,975,792 B2
(45) Date of Patent: Jul. 12, 2011

(54) STRADDLE TYPE VEHICLE

(75) Inventor: Takayuki Nobuhira, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 429 days.

(21) Appl. No.: 12/193,906

(22) Filed: Aug. 19, 2008

(65) Prior Publication Data
US 2009/0050386 A1 Feb. 26, 2009

(30) Foreign Application Priority Data
Aug. 20, 2007 (JP) ................. 2007-214107

(51) Int. Cl.
*B60K 11/06* (2006.01)

(52) U.S. Cl. .............. 180/68.2; 296/78.1; 296/203.01

(58) Field of Classification Search .......... 180/68.1, 180/68.2, 68.3, 309, 219; 296/192, 203.01, 296/190.09, 193.09, 78.1
See application file for complete search history.

(56) References Cited

U.S. PATENT DOCUMENTS

| | | | |
|---|---|---|---|
| 6,705,417 B2 * | 3/2004 | Kitai et al. | 180/68.1 |
| 7,370,902 B2 * | 5/2008 | Seki et al. | 296/78.1 |
| 7,399,029 B2 * | 7/2008 | Takeshita | 296/203.01 |
| 7,410,025 B2 * | 8/2008 | Sunaguchi et al. | 180/229 |
| 7,647,995 B2 * | 1/2010 | Ishida et al. | 180/68.1 |
| 7,748,746 B2 * | 7/2010 | Beiber Hoeve et al. | 280/835 |

FOREIGN PATENT DOCUMENTS

JP 2007-038736 2/2007

* cited by examiner

*Primary Examiner* — John D Walters
(74) *Attorney, Agent, or Firm* — Keating & Bennett, LLP

(57) ABSTRACT

A straddle-type vehicle provided with a transmission air intake passage for sending air into a transmission case housing a continuously variable transmission prevents an increase in vehicle width and prevents sand or the like from entering the air intake passage by covering the front side of the air intake passage. The transmission air intake passage extends upward from the transmission case on an outer side in a vehicle width direction of a main frame. A rearward cover covers the main frame and extends outward in the vehicle width direction to cover the rear side of the transmission air intake passage. A forward cover is curved forward from an edge outside in the vehicle width direction of a right leg shield part constructing the rearward cover and covers the transmission air intake passage from a front side.

11 Claims, 18 Drawing Sheets

STRADDLE TYPE VEHICLE

RELATED APPLICATIONS

This application claims the benefit of priority under 35 USC 119 of Japanese patent application no. 2007-214107, filed on Aug. 20, 2007, which application is hereby incorporated by reference in its entirety.

BACKGROUND OF THE INVENTION

1. Field of the Invention

The present invention relates to a straddle-type vehicle and, in particular, to an air intake passage for sending air into a case for housing a continuously variable transmission of the straddle-type vehicle.

2. Description of Related Art

A motorcycle having an air intake passage for sending air into a case housing a continuously variable transmission in order to cool the belt of the continuously variable transmission is proposed in Japanese Unexamined Patent Publication No. 2007-38736. JP 2007-38736 discloses a motorcycle that has a continuously variable transmission arranged in a lower portion of a vehicle body and an air intake passage that extends upward from the case of the continuously variable transmission. The front side of the air intake passage is covered by a leg shield to prevent sand or the like from entering the air intake passage.

However, the leg shield of JP 2007-38736 is constructed of two wall parts opening in the shape of a letter V rearward of the vehicle body, and the air intake passage is arranged between the wall parts. Of the two wall parts, a wall part positioned on the center side in the vehicle width direction of the air intake passage extends from the front side of the air intake passage via the center side in the vehicle width direction of the air intake passage and then connects to a vehicle body frame cover, whereby the leg shield is supported by the front portion of the air intake passage. For this reason, the air intake passage needs to be arranged outside in the vehicle width direction by the amount of the wall part positioned on the center side in the vehicle width direction of the air intake passage, which increases the width of the vehicle.

SUMMARY OF THE INVENTION

The present invention addresses this problem and provides a straddle-type vehicle having an air intake passage for sending air into a case for housing a continuously variable transmission in which vehicle width is not increased and the front side of the air intake passage is covered to prevent sand or the like from entering the air intake passage.

A straddle-type vehicle according to the present invention includes a cover that covers a main frame extended rearward from a front portion of a vehicle body. A transmission case houses a belt-type continuously variable transmission arranged in a lower portion of the vehicle body. A transmission air intake passage extends upward from the transmission case on an outer side in a vehicle width direction of the main frame. The cover includes a rearward cover that covers the main frame, extends outward in the vehicle width direction and covers a rear side of the transmission air intake passage; and a forward cover that is curved forward from an edge outside in the vehicle width direction of the rearward cover and that covers the transmission air intake passage from a front side.

According to the present invention, the forward cover prevents sand or the like from entering the transmission air intake passage. Moreover, the forward cover is curved forward from the edge outside in the vehicle width direction of the rearward cover and covers the transmission air intake passage from the front side, so that the rearward cover supports the forward cover on the front side of the transmission air intake passage and prevents an increase in the vehicle width.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
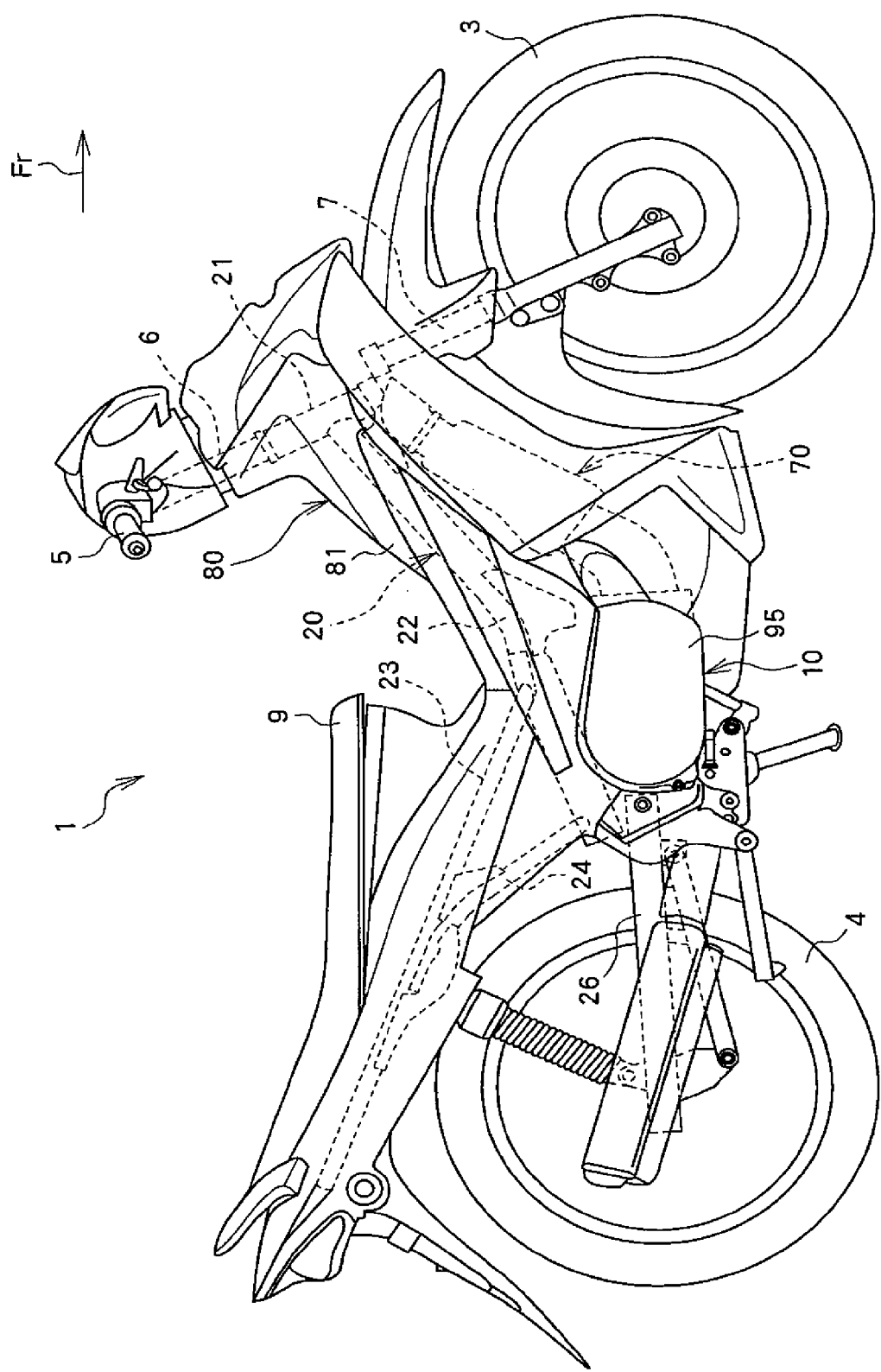
FIG. 1 is a side view of a motorcycle according to an embodiment of the present invention.
Figure 2:
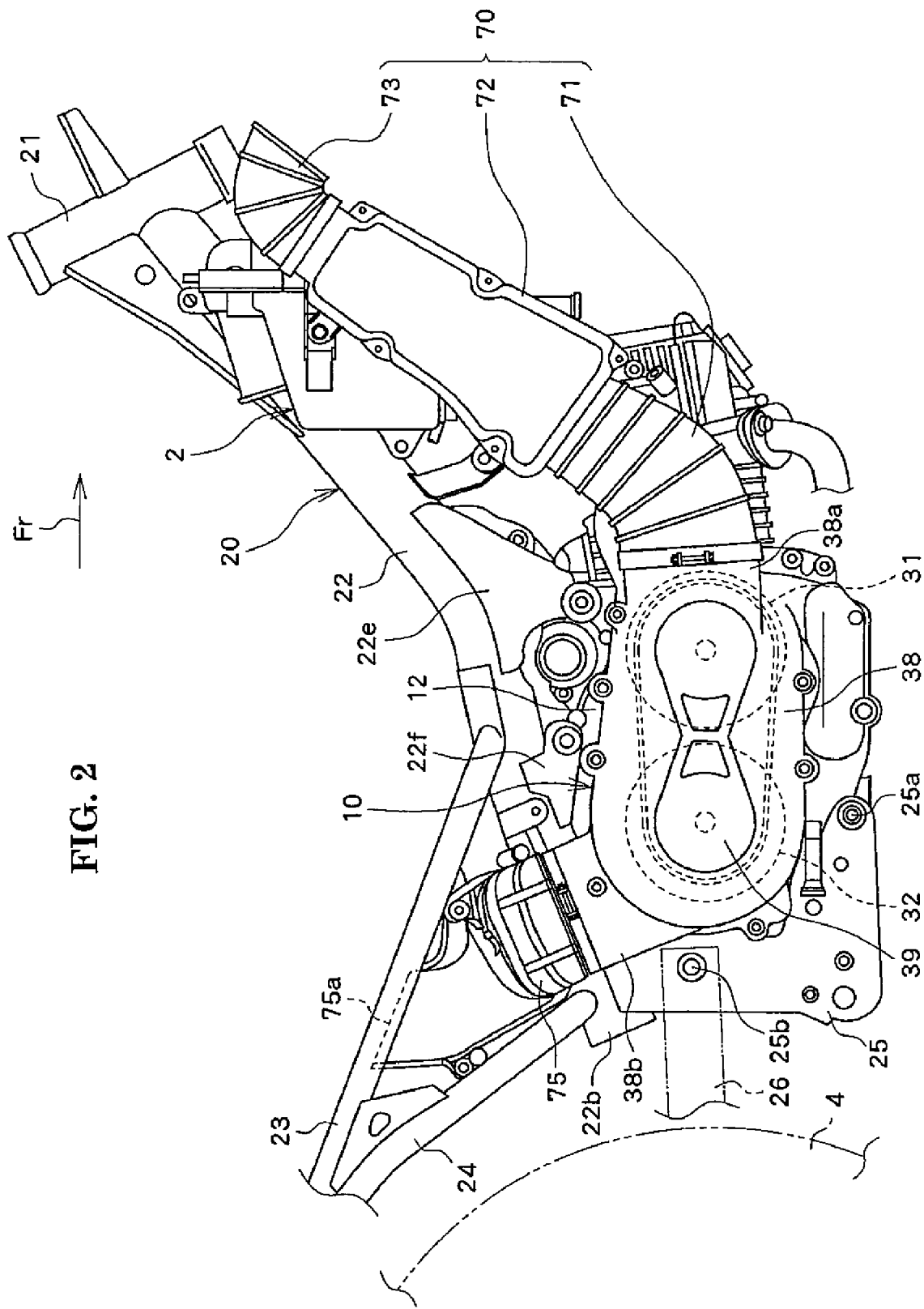
FIG. 2 is a right side view of an engine unit and a vehicle body frame of the motorcycle.
Figure 3:
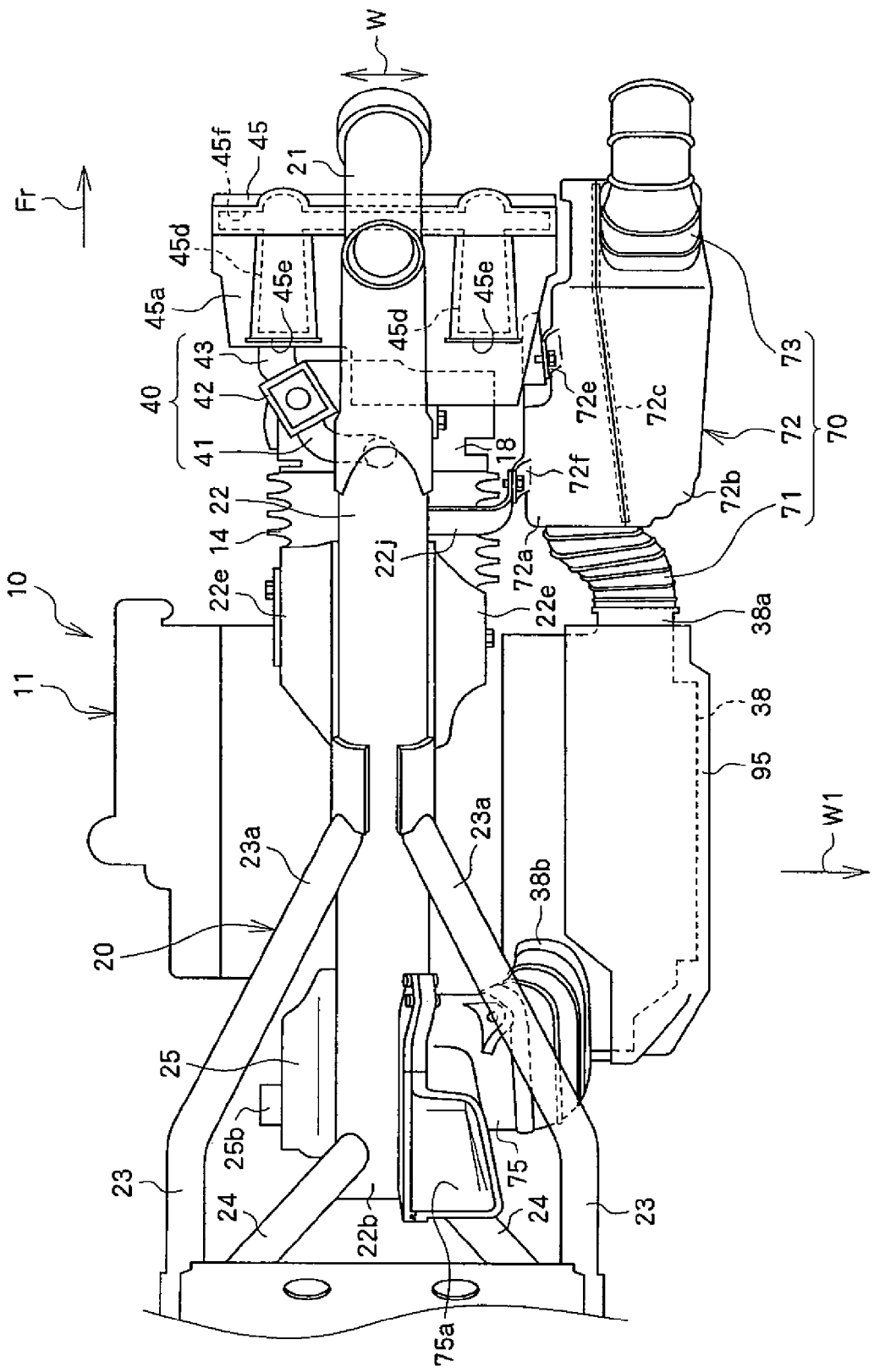
FIG. 3 is a plan view of the engine unit and the vehicle body frame.
Figure 4:
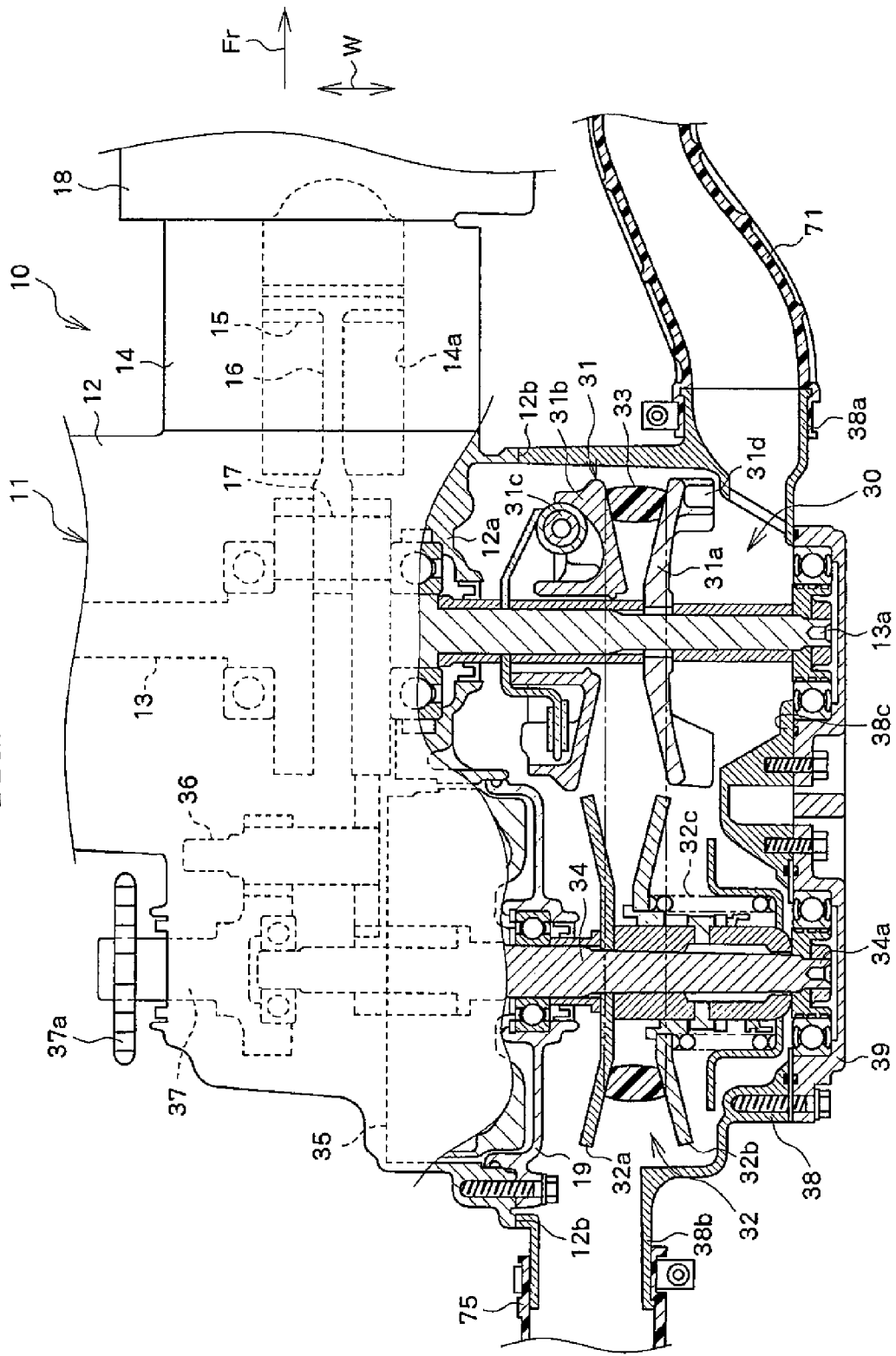
FIG. 4 is a partial sectional view of the engine unit.
Figure 5:
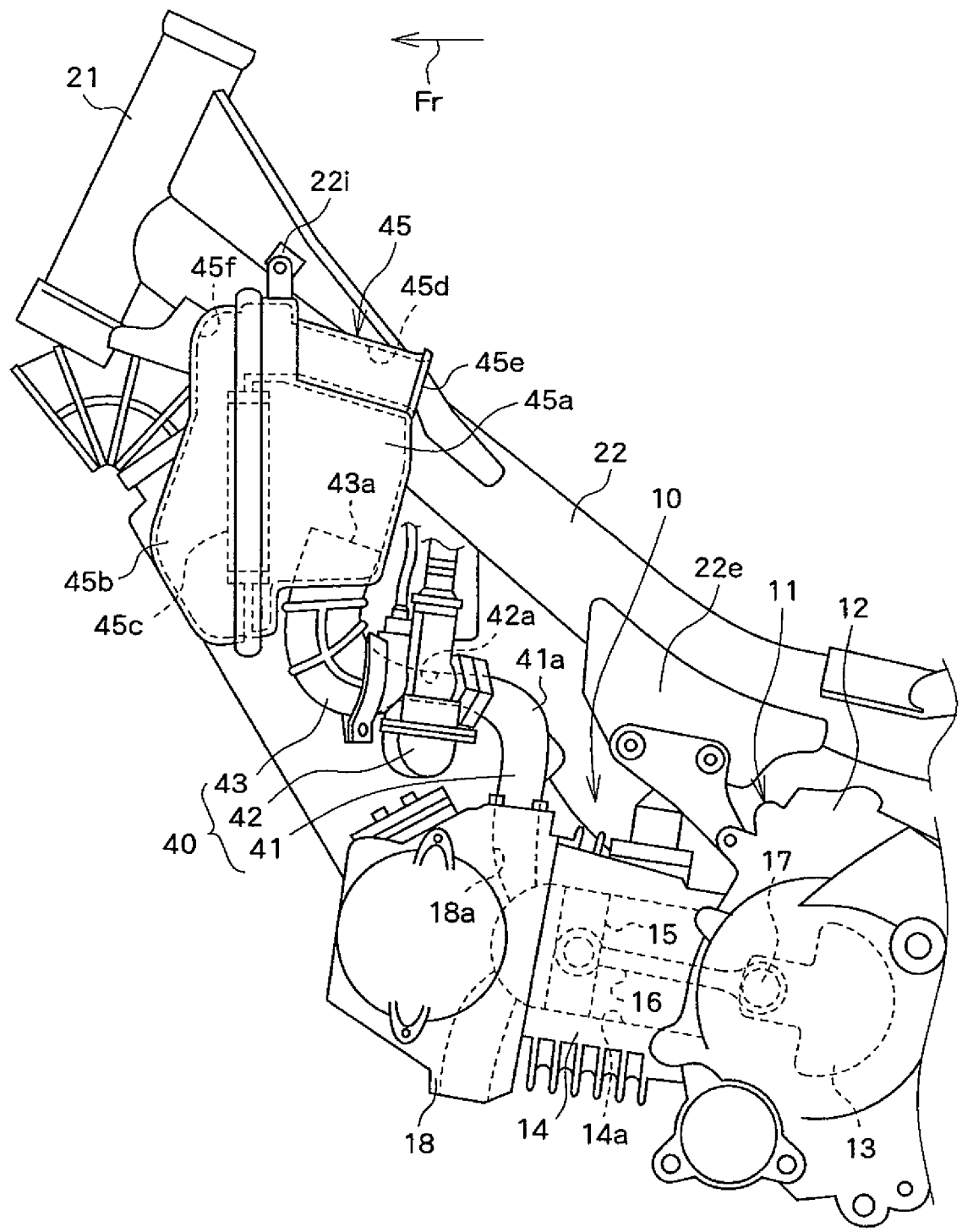
FIG. 5 is a left side view of the engine unit.

An embodiment of the invention is now described with reference to the drawings. FIG. 1 is a side view of a motorcycle 1, which is an example of a straddle-type vehicle according to an embodiment of the present invention. The straddle-type vehicle may be, for example, a motorcycle (including a scooter), a four-wheel buggy or a snow mobile. FIG. 2 is a right side view of an engine unit 10 and a vehicle body frame 20 of motorcycle 1. FIG. 3 is a plan view of engine unit 10 and vehicle body frame 20. FIG. 4 is a partial sectional view of engine unit 10. FIG. 5 is a left side view of engine unit 10.

As shown in FIG. 1, motorcycle 1 also includes vehicle body frame 20, a front wheel 3, a rear wheel 4 and an exterior cover 80. As shown in FIGS. 2 and 3, vehicle body frame 20 includes a steering head 21 and a main frame 22. Vehicle body frame 20 also includes left and right seat rails 23, 23, stays 24, 24 and brackets 25, 25. The right side bracket 25 is illustrated in FIG. 2 and the left side bracket 25 is illustrated in FIG. 3.

Steering head 21 is fixed to the front end portion of vehicle body frame 20 and rotatably supports a steering shaft 6 (FIG. 1). A front fork 7 is connected to the bottom end portion of steering shaft 6, and the bottom end portion of front fork 7 supports front wheel 3. The top end portion of steering shaft 6 is connected to a handlebar 5.

As shown in FIG. 2, the front end portion of main frame 22 is connected to steering head 21. Main frame 22 slants downward toward the rear portion of the vehicle body (in a direction opposite to direction Fr) from its front end portion, and its rear (bottom) end portion 22b is positioned in front of rear wheel 4. Main frame 22 is covered with exterior cover 80 from above (FIG. 1). Exterior cover 80 is described in detail later.

The front end portion of seat rail 23 is connected to the middle portion of main frame 22. Seat rail 23 slants upward toward the rear portion of the vehicle body from its front end portion. As shown in FIG. 3, front portion 23a of seat rail 23 extends outward in a vehicle width direction (direction W) toward the rear portion of the vehicle body.

As shown in FIG. 2, the front end portion of stay 24 is connected to rear end portion 22b of main frame 22. Stay 24 slants upward from its front end portion and its top end portion is connected to seat rail 23.

Bracket 25 is formed in the shape of a plate and its top edge portion is joined to rear end portion 22b of main frame 22. Bracket 25 extends downward from the top edge portion. A top portion of bracket 25 has a support portion 25b for supporting a pivot shaft. A front end portion of a rear arm 26 that supports the axle of rear wheel 4 is fixed to the pivot shaft. Rear arm 26 and rear wheel 4 swing on the pivot shaft independently of engine unit 10.

As shown in FIG. 2, engine unit 10 is arranged in front of rear wheel 4 and is supported by vehicle body frame 2. Bracket 25 has a support portion 25a on the front side of its lower portion. Main frame 22 has a bracket 22e fixed thereto that extends downward, and a bracket 22f joined thereto rearward of bracket 22e that also extends downward. Engine unit 10 is arranged below the rear portion of main frame 22. The top wall on the front side of a crankcase 12 included by engine unit 10 is fixed to bracket 22e, and the top wall on the rear side of crankcase 12 is fixed to bracket 22f. The lower portion of crankcase 12 is fixed to support portion 25a of bracket 25. Brackets 22e and 22f are a pair of left and right parts. In FIG. 2, only the right side brackets 22e, 22f are shown.

As shown in FIG. 4, engine unit 10 includes an engine 11 and a belt-type continuously variable transmission 30. As shown in FIG. 5, engine unit 10 also includes an engine air intake passage 40 for supplying engine 11 with air and an engine air cleaner 45 for cleaning outside air to be sent to engine air intake passage 40.

As shown in FIG. 4 or 5, engine 11 includes crankcase 12, a crankshaft 13, a cylinder block 14, a piston 15 and a cylinder head 18. A cylinder 14a is formed in cylinder block 14. Cylinder block 14 and cylinder head 18 slant upward toward the front portion of the vehicle body from crankcase 12 in the front portion of engine 11, and the axis line of cylinder 14a is slightly slanted upward with respect to a direction in which the vehicle travels (direction Fr). Piston 15 is arranged in cylinder 14a and is coupled to a crankshaft 13 via a connecting rod 16 and a crankpin 17. When an air-fuel mixture of fuel and air flows into cylinder 14a through engine air intake passage 40 and through an air intake port 18a (FIG. 5) formed in cylinder head 18 and combusts, piston 15 reciprocates in cylinder 14a. Reciprocating motion of piston 15 is converted to rotational motion by crankshaft 13 and is outputted to the downstream side of a transmission path of drive force.

Engine air intake passage 40 is now described. As shown in FIG. 5, engine air intake passage 40 extends upward of the vehicle body from the front portion of engine 11 and is connected to engine air cleaner 45 arranged slantwise upward of engine 11. Engine air intake passage 40 supplies air passing through engine air cleaner 45 to engine 11. Engine air intake passage 40 comprises an air intake pipe 41, a throttle body 42 and a duct 43.

As shown in FIG. 5, air intake pipe 41 is connected to an air intake port 18a formed in cylinder head 18. Air intake pipe 41 extends upward from air intake port 18a and is bent forward (in direction Fr) at a bent portion 41a. The front (top) end portion of air intake pipe 41 is connected to a throttle body 42 positioned above cylinder head 18.

An air passage 42a through which air flows is formed in throttle body 42. Air passage 42a extends forward in throttle body 42. A throttle valve opening by an amount responsive to operation of the throttle valve by the occupant is disposed on air passage 42a. Throttle body 42 includes, for example, a carburetor and an injector and supplies fuel supplied from a fuel tank to the air flowing through air passage 42a.

The rear end portion of duct 43 is connected to throttle body 42. Duct 43 is bent upward from its rear end portion, and an intake port 43a formed in its tip portion (top end portion) is connected to engine air cleaner 45.

Figure 6:
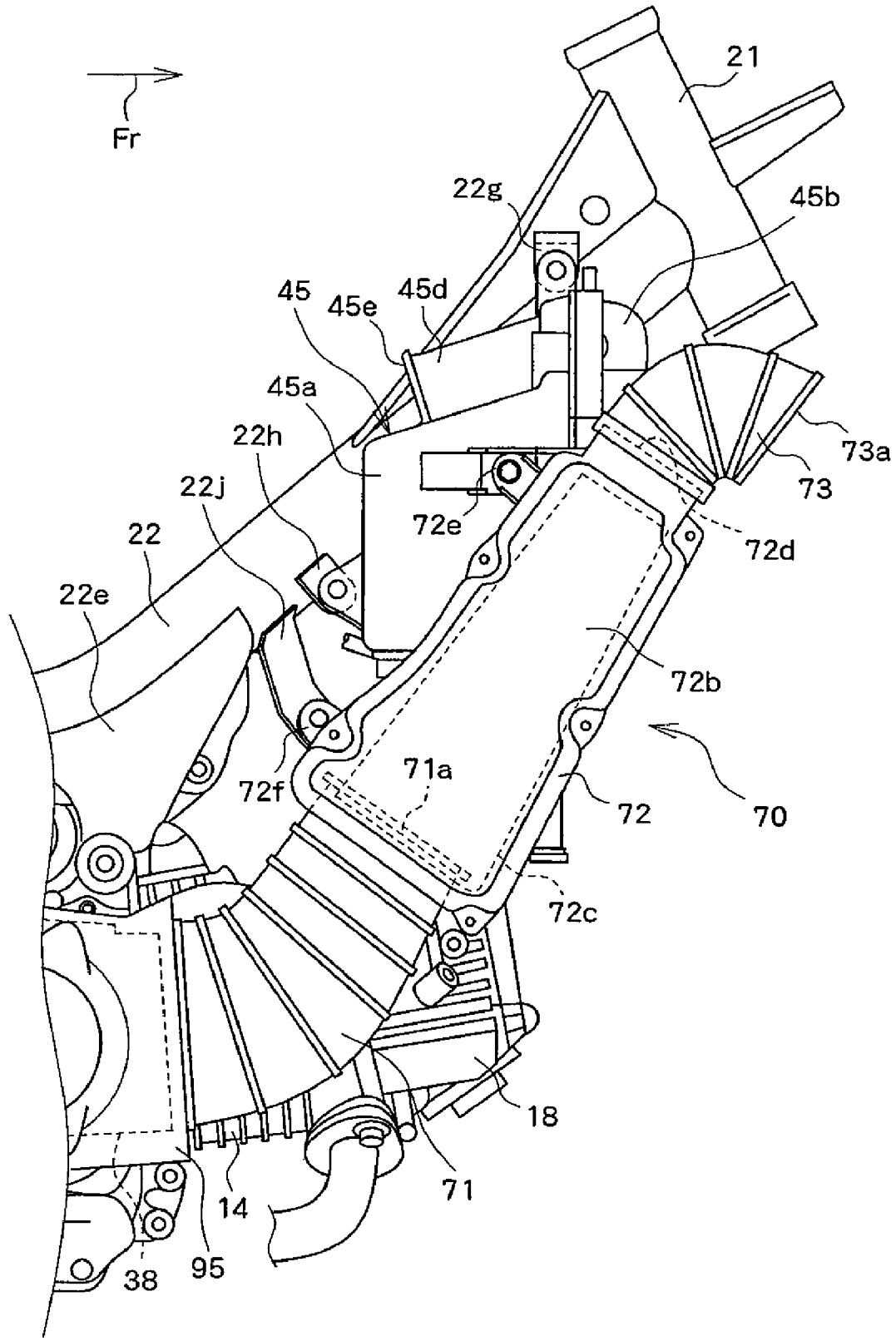
FIG. 6 is a right side view of the engine unit and a front portion of the vehicle body frame.

Engine air cleaner 45 is now described. As shown in FIG. 5, engine air cleaner 45 is disposed below the front portion of main frame 22 and is supported by main frame 22. FIG. 6 is a right side view of vehicle body frame 20 and the front portion of engine unit 10. Brackets 22g and 22h are joined to the outer peripheral surface of main frame 22 on the right side of main frame 22 (FIG. 6). A bracket 22i is joined to the outer peripheral surface of main frame 22 on the left side of main frame 22 (FIG. 5). A case body 45a included by engine air cleaner 45 is fixed to brackets 22g, 22h and 22i.

As shown in FIG. 5, engine air cleaner 45 also includes a filter 45c for cleaning air to be sent to engine 11 and a case cover 45b that is fixed to case body 45a and covers filter 45c. As shown in FIG. 3, engine air cleaner 45 has left and right air intake passages 45d for introducing outside air into engine air cleaner 45.

As shown in FIG. 3, air intake passages 45d, 45d are disposed on the top portion of case body 45a and are positioned on both left and right sides of main frame 22. As shown in FIG. 5, air intake passage 45d extends rearward (in a direction opposite to direction Fr). An air intake port 45e that is disposed at the end portion of air intake passage 45d and that takes in outside air is open to the rear side. Air intake passage 45d extends rearward and slants slightly downward, and air intake port 45e is open in a slant down direction.

As shown in FIG. 5, a passage 45f connecting to air intake passages 45d, 45d is formed in the upper portion of case cover 45b. Passage 45f extends downward and connects to an air chamber in case cover 45b positioned in front of filter 45c. Filter 45c partitions the interior of engine air cleaner 45 into an air chamber whose outside wall is constructed by case cover 45b and an air chamber whose outside wall is constructed by case body 45a.

Figure 7:
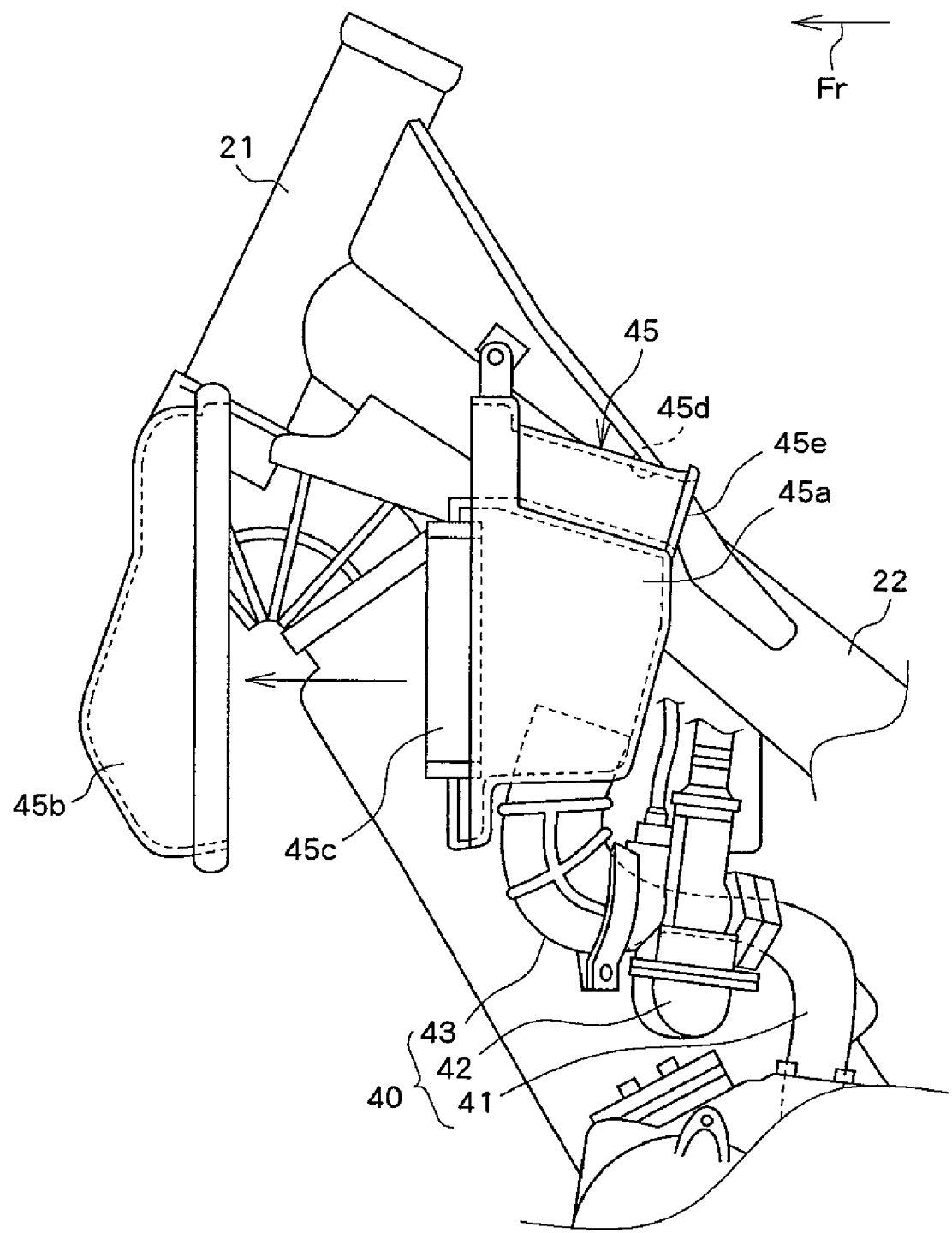
FIG. 7 is a side view of an engine air cleaner from which a case cover is removed.

Filter 45c expands in a direction nearly perpendicular to a direction in which the vehicle travels in the front portion of case body 45a and is supported by case body 45a. Case cover 45b is fixed to case body 45a with removable fastening parts such as bolts. When case cover 45b is removed from case body 45a, filter 45c is exposed. FIG. 7 is a side view of engine air cleaner 45 from which case cover 45b is removed. As shown in FIG. 7, case cover 45b can be removed forward (in direction Fr) from case body 45a. When case cover 45b is removed, filter 45c is exposed to the front.

Case body 45a has an opening formed in its bottom wall. As shown in FIG. 5, an air intake port 43a formed in the tip portion of duct 43 is inserted into case body 45a through the opening. As described above, duct 43 has throttle body 42 connected thereto, and throttle body 42 has air intake pipe 41 connected thereto. Outside air sucked from air intake port 45e of engine air cleaner 45 passes through air intake passage 45d and passage 45f and then is introduced into air chamber in case cover 45b. Thereafter, the sucked air passes through filter 45c and is moved to the air chamber in case body 45a and passes through duct 43, throttle body 42, and air intake pipe 41 and then is supplied to engine 11.

As shown in FIG. 2 and FIG. 3, engine unit 10 includes a transmission case 38 for housing continuously variable transmission 30, a transmission air intake passage 70 for sending outside air for cooling continuously variable transmission 30 into transmission case 38, and an air exhaust duct 75 for exhausting air in transmission case 38. Transmission air intake passage 70 includes an air intake duct 71 and a tip duct 73, and a transmission air cleaner 72 for cleaning air flowing through transmission air intake passage 70 is arranged on transmission air intake passage 70.

As shown in FIGS. 3 and 4, continuously variable transmission 30 is arranged outside in the vehicle width direction of crankcase 12. As shown in FIG. 4, continuously variable transmission 30 includes a driving side pulley 31, a driven side pulley 32 and a belt 33.

Driving side pulley 31 includes a fixed sheave 31a whose axial movement is restricted, a movable sheave 31b whose axial movement is allowed; and a weight roller 31c that is moved in the radial direction by centrifugal force and that pushes movable sheave 31b to the fixed sheave 31a side. A fan 31d is formed on fixed sheave 31a and is erected outside in the vehicle width direction. When fan 31d is rotated, outside air is introduced into transmission case 38 from transmission air intake passage 70.

Driven side pulley 32 is mounted on a driven shaft 34 arranged rearward of crankshaft 13 and is rotated with driven shaft 34. Driven side pulley 32 includes a fixed sheave 32a whose axial movement is restricted, a movable sheave 32b whose axial movement is allowed, and a spring 32c for biasing movable sheave 32b to the fixed sheave 32a side. Belt 33 for transmitting torque from driving side pulley 31 to driven side pulley 32 is looped around driving side pulley 31 and driven side pulley 32. In this regard, in the example shown in FIG. 4, crankshaft 13 and driven shaft 34 are extended in the vehicle width direction in transmission case 38, and their end portions 13a, 34a are supported by a support part 39 fixed to the outside wall of transmission case 38.

Continuously variable transmission 30 reduces and transmits rotation of crankshaft 13 to driven shaft 34. Movable sheave 31b of driving side pulley 31 is pressed by weight roller 31c and is brought near to the fixed sheave 31a side according to the rotation speed of crankshaft 13. On the other hand, movable sheave 32b of driven side pulley 32 is separated from fixed sheave 32a against the biasing force of spring 32c. The diameters of portions of belt 33 looped around driving side pulley 31 and driven side pulley 32 are thereby varied to continuously vary a speed reduction ratio.

Rotation transmitted to driven shaft 34 from driven side pulley 32 is transmitted to an output shaft 37 arranged coaxially with driven shaft 34 via an automatic clutch 35 mounted on driven shaft 34 and via an intermediate shaft 36 arranged forward of driven shaft 34. Rotation of a sprocket 37a mounted on output shaft 37 is transmitted to a sprocket to be rotated with axle 4a of rear wheel 4 via a chain.

As shown in FIG. 4, transmission case 38 is adjacent to crankcase 12 in the vehicle width direction and is fixed to edge 12b of crankcase 12. As described above, transmission case 38 houses continuously variable transmission 30, driving side pulley 31 is arranged in the front portion of transmission case 38, and a driven side pulley 32 is arranged in the rear portion of transmission case 38. The front portion of transmission case 38 and the interior of crankcase 12 are partitioned by a partition wall 12a for supporting crankshaft 13. The rear portion of transmission case 38 and the interior of crankcase 12 are partitioned by a partition part 19. Transmission case 38 is covered with a transmission case cover 95 externally in the vehicle width direction (FIGS. 1 and 3).

As shown in FIGS. 4 and 2, transmission case 38 has an air intake side end connection 38a and an air exhaust side end connection 38b formed therein. Air exhaust side end connection 38b is disposed in and extends upward from the upper portion on the rear side of transmission case 38. As shown in FIG. 2, air exhaust duct 75 is connected to and extends upward from air exhaust side end connection 38b. Moreover, as shown in FIG. 3, air exhaust duct 75 is bent in a middle portion thereof, and an air exhaust port 75a of air exhaust duct 75 is shifted to the center side in the vehicle width direction with respect to air exhaust side end connection 38b of transmission case 38.

Air intake side end connection 38a protrudes forward from the front portion of transmission case 38. As shown in FIG. 4, a bulging portion 38c bulging in the vehicle width direction is formed in the front portion of transmission case 38. Air intake side end connection 38a protrudes forward from bulging portion 38c and is positioned outward in the vehicle width direction of fan 31d formed on driving side pulley 31. Transmission air intake passage 70 is connected to air intake side end connection 38a (FIG. 3).

As shown in FIG. 4, air exhaust side end connection 38b and air intake side end connection 38a are arranged at positions opposite to each other across belt 33 of continuously variable transmission 30. Air intake side end connection 38a is positioned outside in the vehicle width direction in transmission case 38, and air exhaust side end connection 38b is positioned on the center side in the vehicle width direction in transmission case 38.

Transmission air intake passage 70 is now described. As shown in FIGS. 2 and 3, transmission air intake passage 70 extends upward of the vehicle body from the front portion of transmission case 38, on the outside in the vehicle width direction relative to main frame 22, cylinder block 14, engine air cleaner 45 and engine air intake passage 40. As described above, engine unit 10 includes air intake duct 71, transmission air cleaner 72, and tip duct 73 as transmission air intake passage 70.

Air intake duct 71 is connected to air intake side end connection 38a of transmission case 38 and slants upward from air intake side end connection 38a on the outside in the vehicle width direction relative to cylinder block 14. Transmission air cleaner 72 is fixed to intake port 71a formed in the top end portion of air intake duct 71 (FIG. 6).

As shown in FIG. 3 or 6, transmission air cleaner 72 has a nearly rectangular shape extending slantwise upward. Transmission air cleaner 72 is adjacent to engine air cleaner 45, on the outside in the vehicle width direction relative to engine air cleaner 45 and is supported by engine air cleaner 45 and main frame 22. Transmission air cleaner 72 includes a case body 72a and a case cover 72b. As shown in FIG. 3, a fixing part 72f and a fixing part 72e positioned slantwise above fixing part 72f are formed on the outside wall of case body 72a. Fixing part 72e is fixed to the outside wall of engine air cleaner 45, for example, with bolts. A bracket 22j extended in the vehicle width direction is fixed to main frame 22, and fixing part 72f is fixed to bracket 22j.

Case body 72a has an opening formed in its bottom wall. Intake port 71a of air intake duct 71 is connected to the opening. An intake port 72d protruding upward is formed in the top wall of case cover 72b. A tip duct 73 is fixed to intake port 72d.

The interior of transmission air cleaner 72 is partitioned into an air chamber connecting to air intake port 72d and an air chamber connecting to intake port 71a of air intake duct 71 by a filter 72c. The air chamber connecting to air intake port 72d has case cover 72b as the outside wall, and the air chamber connecting to intake port 71a of air intake duct 71 has case body 72a as the outside wall. Filter 72c is formed nearly in a rectangular shape and extends in a slant up-and-down direction (see FIG. 3).

Figure 8:
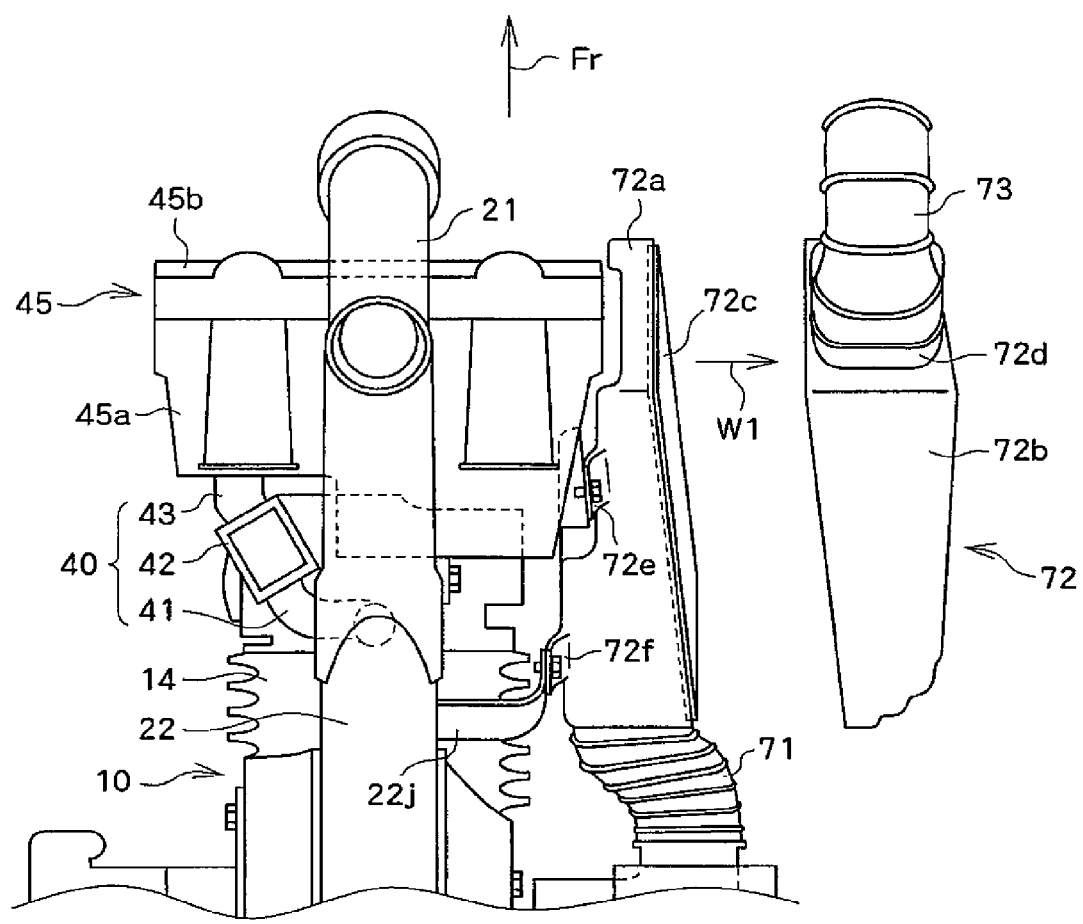
FIG. 8 is a plan view of a transmission air cleaner from which a case cover is removed.

Case cover 72b is fixed to case body 72a with removable fastening parts such as bolts. When case cover 72b is removed from case body 72a, filter 72c is exposed. FIG. 8 is a plan view of transmission air cleaner 72 from which case cover 72b is removed. As shown in FIG. 8, case cover 72b can be removed from case body 72a in a direction different from a direction in which case cover 45b of engine air cleaner 45 is removed (in this example, in the forward direction). Case cover 72b can be removed outward in the vehicle width direction (direction W1) from case body 72a, so that case cover 45b and case cover 72b are removed in directions perpendicular to each other. When case cover 72b is removed, filter 72c is exposed outside in the vehicle width direction.

As shown in FIG. 6, tip duct 73 is fixed to intake port 72d of transmission air cleaner 72. Tip duct 73 has an air intake port 73a, which takes in outside air, formed at a position higher than intake port 72d and sends outside air taken in from air intake port 73a to transmission air cleaner 72. Air intake port 73a is open in a direction opposite to air intake port 45e of engine air cleaner 45. Tip duct 73 is bent forward from intake port 72d, and air intake port 73a formed in its end portion is open slantwise downward toward the front. As is described later, air intake port 73a of tip duct 73 is covered with exterior cover 80 from its front side.

Figure 9:
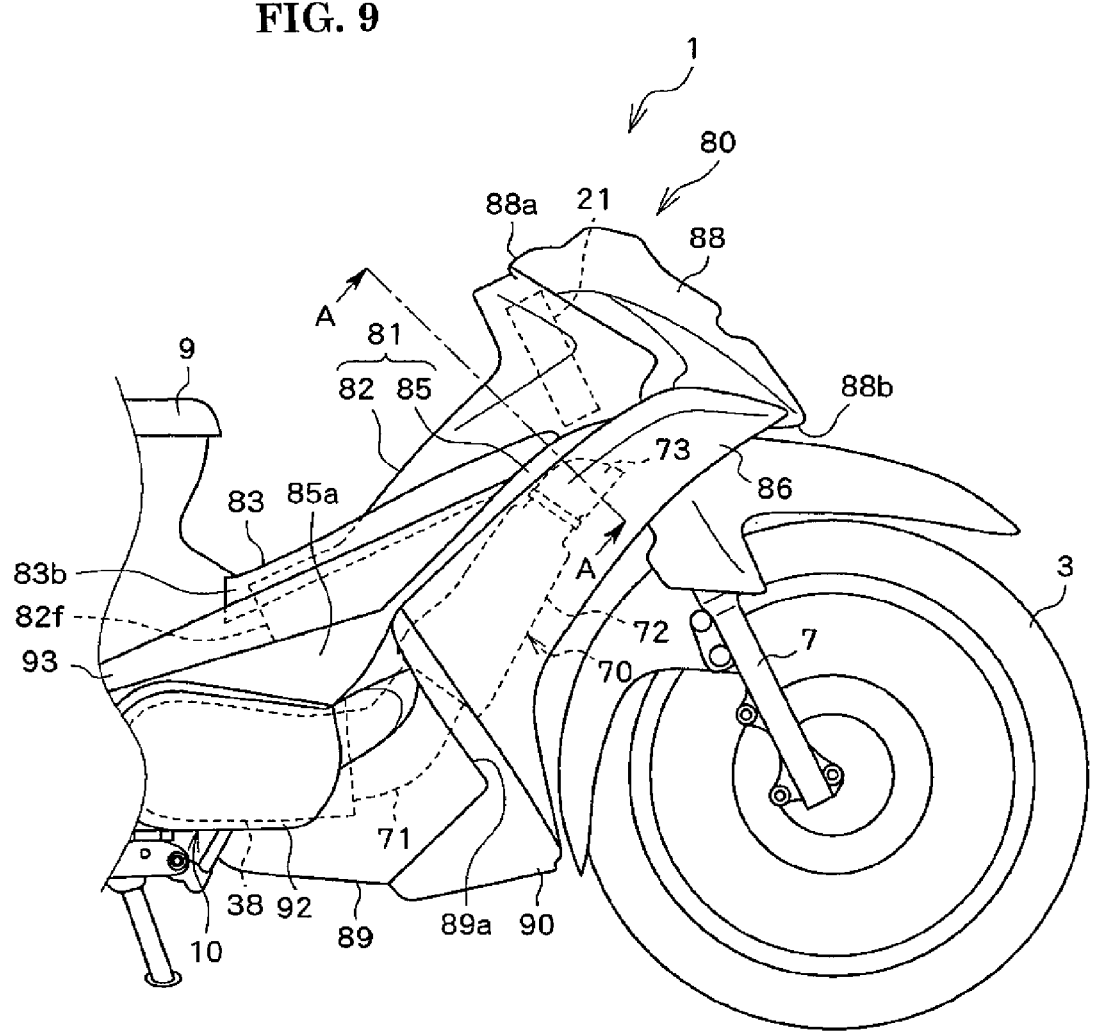
FIG. 9 is a side view of a front portion of the motorcycle.
Figure 10:
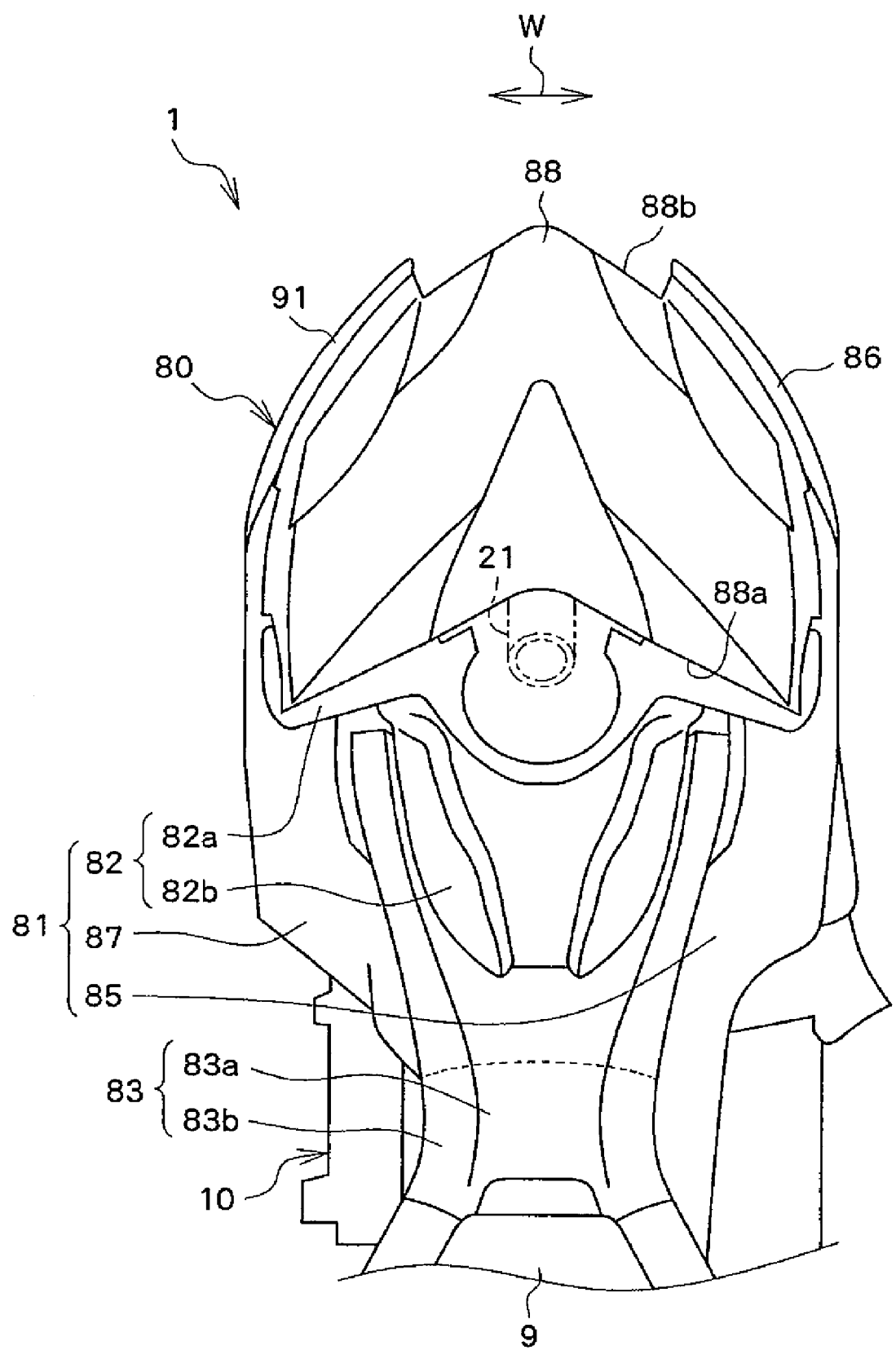
FIG. 10 is a plan view of a front portion of an exterior cover for covering the motorcycle.
Figure 11:
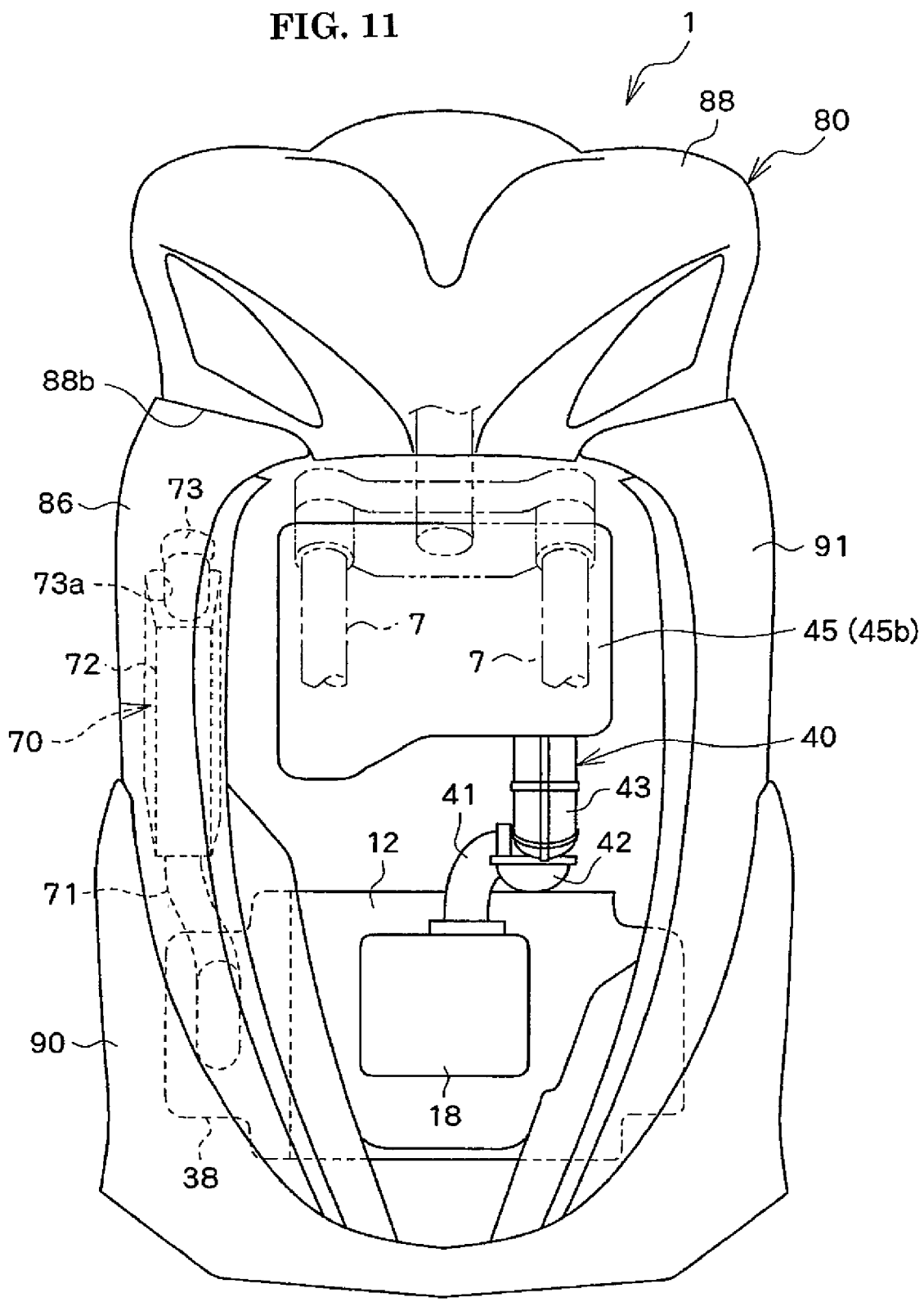
FIG. 11 is a front view of the motorcycle.
Figure 12:
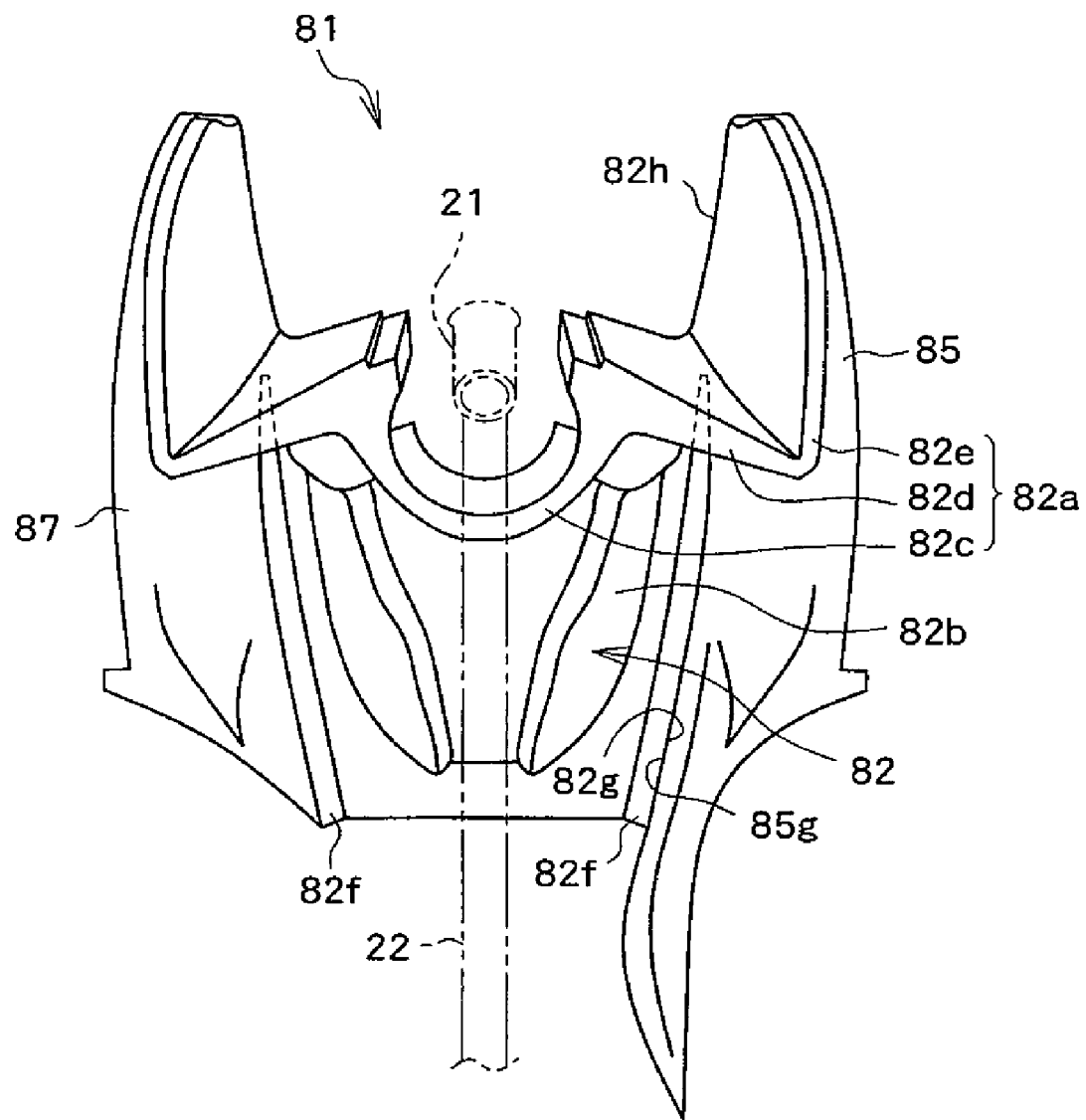
FIG. 12 is a plan view of a rearward cover of the exterior cover.
Figure 13:
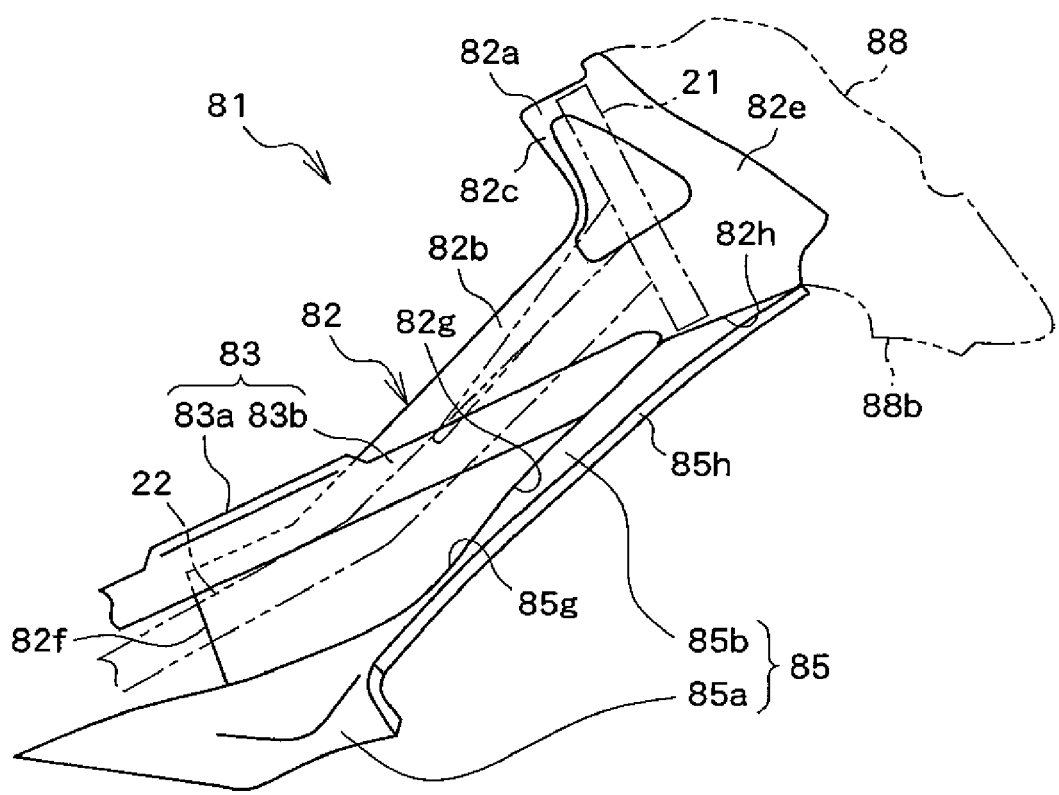
FIG. 13 is a side view of the rearward cover.
Figure 14:
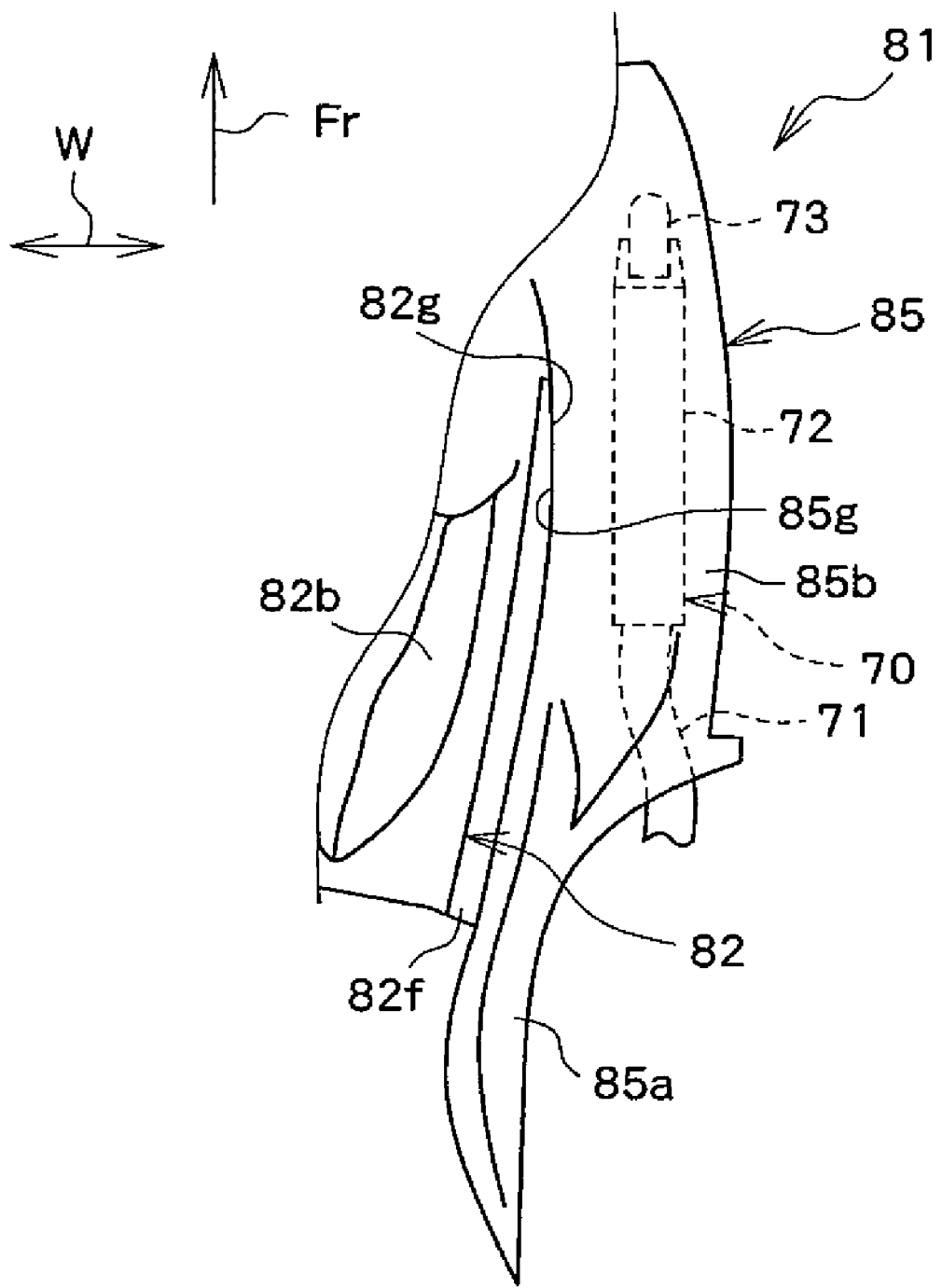
FIG. 14 is a plan view of a right leg shield part of the rearward cover.
Figure 15:
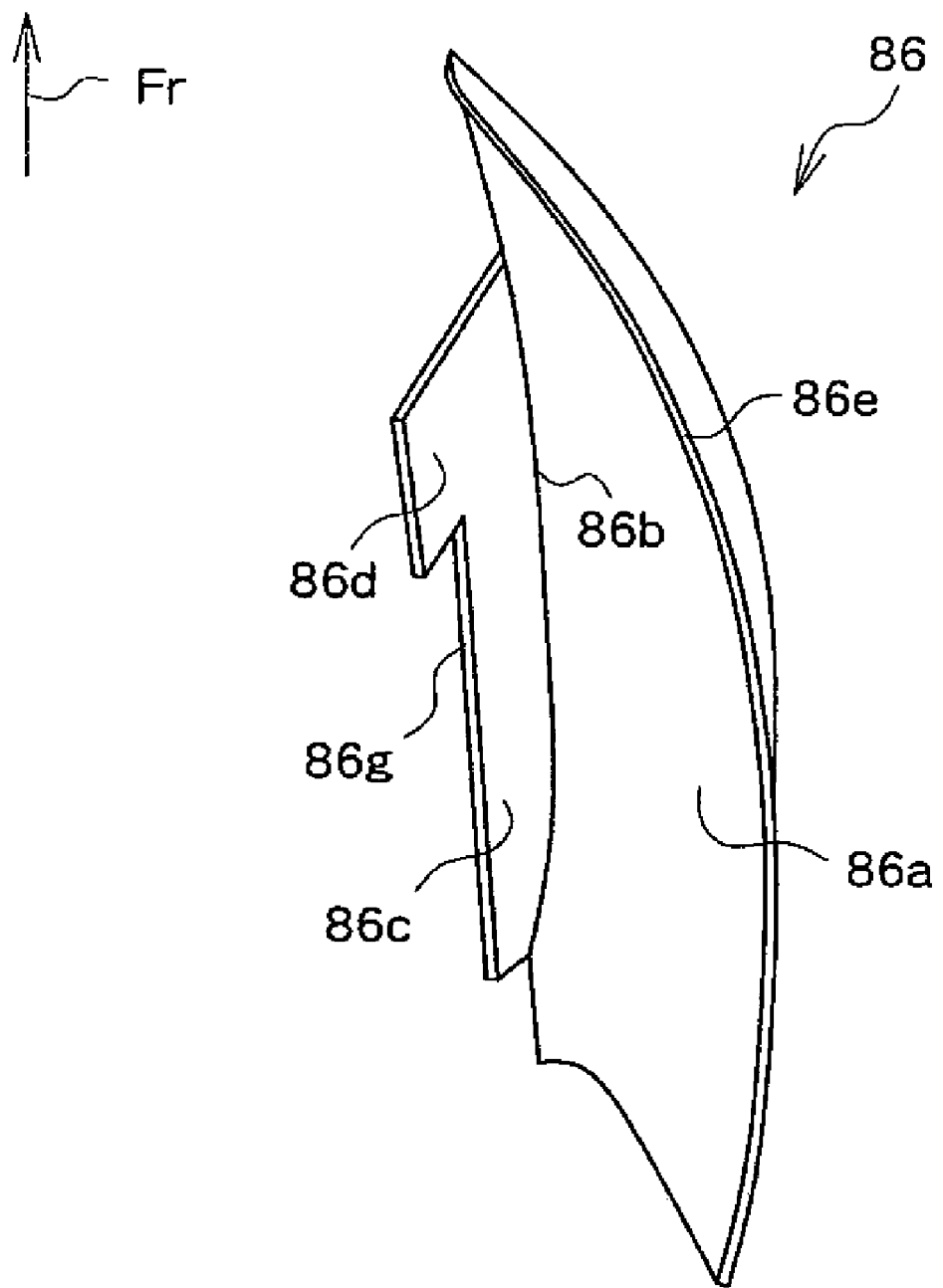
FIG. 15 is a plan view of a forward cover of the exterior cover.
Figure 16:
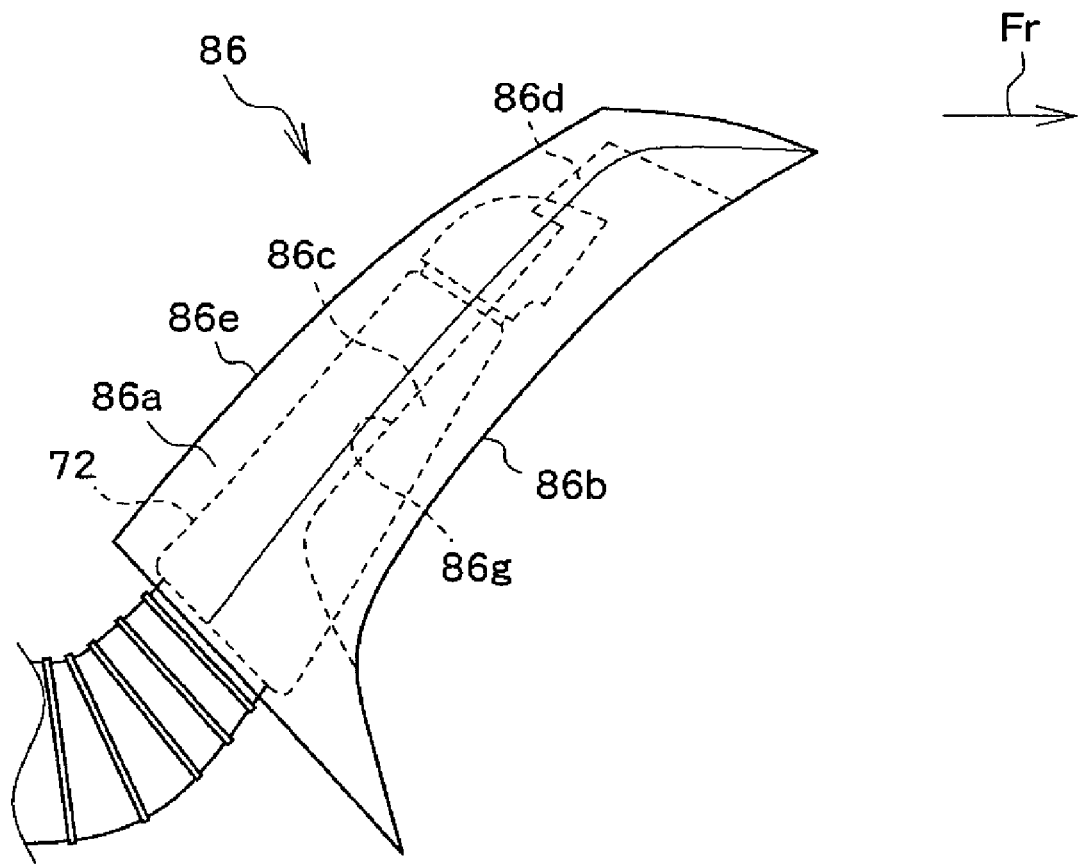
FIG. 16 is a side view of the forward cover.
Figure 17:
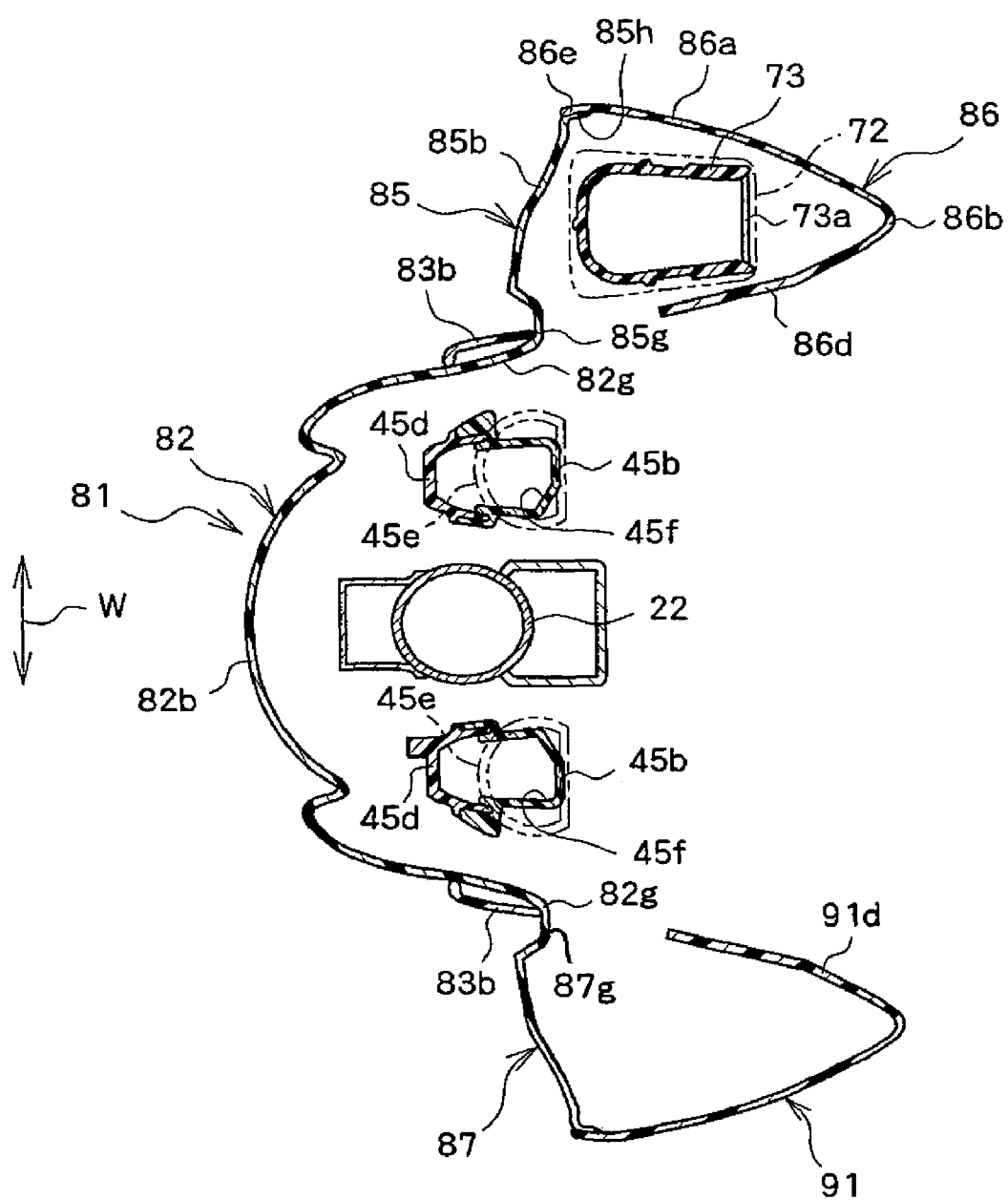
FIG. 17 is a sectional view taken along line A-A of FIG. 9.
Figure 18:
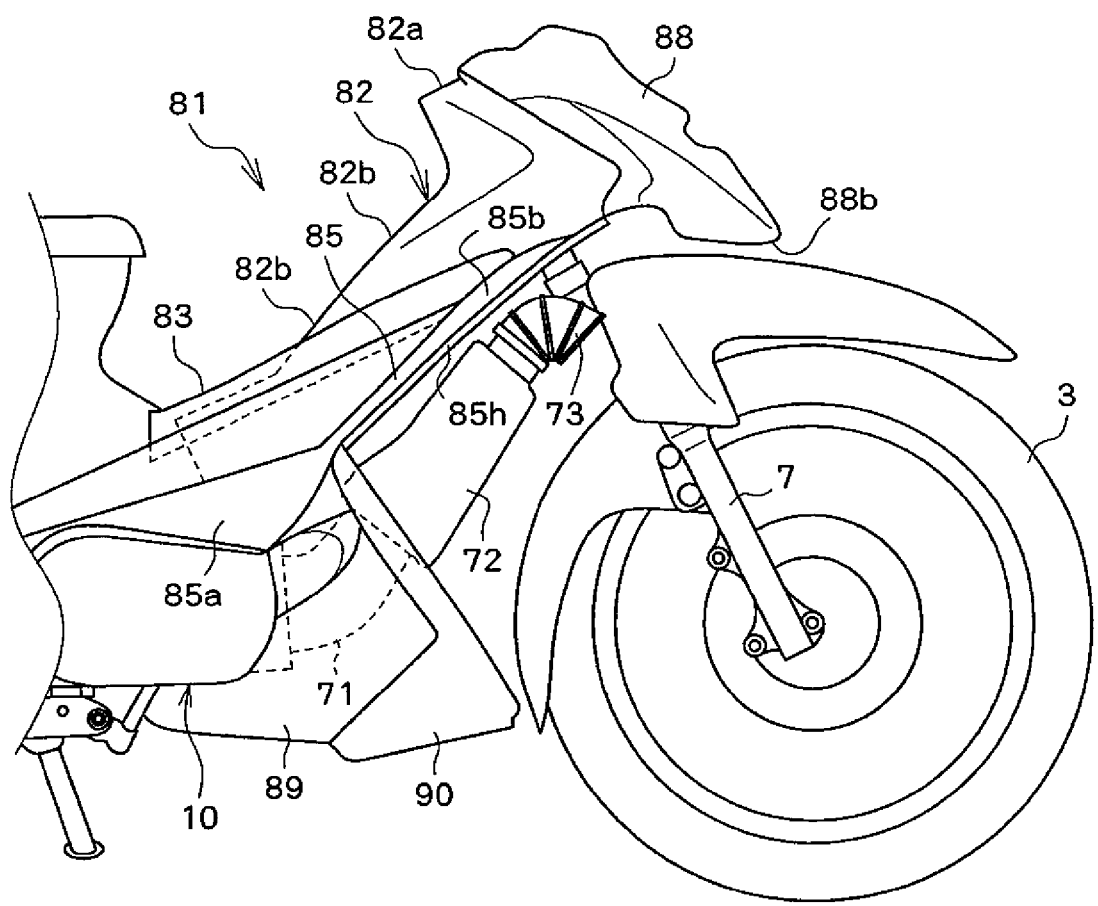
FIG. 18 is a right side view of a front portion of a vehicle body in a state where the forward cover is removed.

Exterior cover 80 is now described. FIG. 9 is a side view of the front portion of motorcycle 1, FIG. 10 is a plan view of the front portion of exterior cover 80, and FIG. 11 is a front view of motorcycle 1. In FIGS. 9-11, front wheel 3 and handlebar 5 are omitted. FIG. 12 is a plan view of a rearward cover 81 of exterior cover 80, FIG. 13 is a side view of rearward cover 81, and FIG. 14 is a plan view of a right leg shield part 85 of rearward cover 81. FIG. 15 is a plan view of a forward cover 86 of exterior cover 80, and FIG. 16 is a side view of forward cover 86. FIG. 17 is a sectional view taken along line A-A of FIG. 9, and FIG. 18 is a right side view of the front portion of motorcycle 1 in the state where forward cover 86 is removed.

As shown in FIG. 9, exterior cover 80 includes not only rearward cover 81 and forward cover 86, but also a frame center cover 83, a front cover 88, an engine front cover 89 and an under cover 90.

As shown in FIGS. 9 and 10, front cover 88 expands in the vehicle width direction in front of steering head 21. As shown in FIG. 9, front cover 88 protrudes forward such that its bottom end edge 88b is positioned forward of its top end edge 88a. Further, front cover 88 is curved such that its center is positioned forward of its outside end edges in the vehicle width direction.

As shown in FIG. 9, engine front cover 89 is arranged forward of transmission case 38 and externally covers cylinder block 14 and air intake duct 71 in the vehicle width direction.

As shown in FIG. 12, rearward cover 81 includes a frame cover part 82, a right leg shield part 85 and a left leg shield part 87. These parts are integrally formed. Frame cover part 82 extends to under seat 9 from behind steering head 21 in the center in the vehicle width direction. Frame cover part 82 expands in the vehicle width direction above main frame 22 to cover main frame 22 from above. Frame cover part 82 includes a head cover portion 82a and a center cover portion 82b.

Head cover portion 82a is arranged rearward of front cover 88 and surrounds the periphery of steering head 21 along with front cover 88 (see FIG. 12 or 13). As shown in FIG. 12, head cover portion 82a includes a cylinder portion 82c formed in the shape of a cylinder opening on a front side, rear wall portions 82d expanded outward in the vehicle width direction from the edges of cylinder portion 82c, and side wall portions 82e extended forward from rear wall portions 82d.

As shown in FIG. 13, center cover portion 82b is positioned in the center in the vehicle width direction and above the front portion of main frame 22 and covers the front portion and covers engine air cleaner 45 arranged under the front portion of main frame 22 from above (FIGS. 5 and 6). Center cover portion 82b is slanted rearward along main frame 22 from the front end portion of main frame 22. As shown in FIGS. 12 and 13, center cover portion 82b expands outward from the center in the vehicle width direction and is bent downward. Side wall portions 82f connecting to center cover portion 82b extend downward and are positioned on both left and right sides of main frame 22.

As shown in FIGS. 10 and 13, frame center cover 83 is arranged above the rear portion of center cover portion 82b. As shown in FIG. 10, a frame center cover 83 includes a top wall portion 83a that expands outward from the center in the vehicle width direction above main frame 22 and the rear portion of center cover portion 82b, and side wall portions 83b, 83b bent downward from left and right end edges of top wall portion 83a. As shown in FIG. 13, top wall portion 83a slants rearward along main frame 22. Side wall portions 83b, 83b extend forward of the vehicle body outside side wall portions 82f connecting to center cover portion 82b. As shown in FIG. 9, a cover 93 elongated in the front-and-rear direction of the vehicle body is fixed to outside portions of side wall portions 83b and 82f.

As shown in FIG. 12, right leg shield part 85 and left leg shield part 87, which are integrally formed with frame cover part 82, are positioned outside in the vehicle width direction of center cover portion 82b. As shown in FIG. 9, right and left leg shield parts 85 and 87 are positioned between engine 11 and front wheel 3 in the front-and-rear direction of the vehicle, and right leg shield part 85 covers transmission air intake passage 70 from the rear (top) side. Forward cover 86 is arranged in front of right leg shield part 85 and covers transmission air intake passage 70 externally in the vehicle width direction and from the front side.

As shown in FIGS. 13, 14 and 17, right leg shield part 85 connects to bottom end edge 82g of side wall portion 82f of center cover portion 82b. Right leg shield part 85 includes a rear wall portion 85a positioned above transmission case 38 (FIG. 9) and a rearward slanted wall portion 85b extended forward from rear wall portion 85a. As shown in FIGS. 13 and 17, an end edge 85g on the center side in the vehicle width direction of rearward slanted wall portion 85b connects to bottom end edge 82g of side wall portion 82f and to bottom end edge 82h of head cover portion 82a. Rearward slanted wall portion 85b expands outward in the vehicle width direction from end edge 85g and slants upward on the rear (top) side of air intake duct 71, transmission air cleaner 72 and tip duct 73. In this manner, rearward cover 81 expands outward from the center in the vehicle width direction and covers main frame 22, engine air cleaner 45 from above (from the rear side) and covers transmission air intake passage 70 from the rear side (from above).

As shown in FIG. 17, an end edge 87g inside in the vehicle width direction of left leg shield part 87 also connects to bottom end edge 82g of center cover portion 82b, and left leg shield part 87 expands outward in the vehicle width direction.

As shown in FIGS. 15-17, forward cover 86 extends forward from an edge 85h outside in the vehicle width direction of right leg shield part 85 and is bent inside and covers transmission air intake passage 70 from the front side. As shown in FIG. 15, forward cover 86 includes an outside wall portion 86a, an inside wall portion 86c and a wind direction guide portion 86d.

As shown in FIGS. 16 and 17, outside wall portion 86a is positioned outside in the vehicle width direction of transmission air cleaner 72 and tip duct 73 and extends from the outer side in the vehicle width direction relative to transmission air cleaner 72 and tip duct 73 to their front sides. Outside wall portion 86a slants upward along transmission air intake passage 70 on the front side of transmission air intake passage 70 and covers transmission air cleaner 72 and air intake port 73a of tip duct 73 from the front side. End edge 86e on the rear (top) side of outside wall portion 86a is fixed to end edge 85h of rearward slanted wall portion 85b, which connects to center cover portion 82b, and to bottom end edge 88b of front cover 88 with removable fastening parts such as bolts (FIGS. 13 and 18). Forward cover 86 is thereby supported by the front side of transmission air intake passage 70.

As shown in FIG. 15 or 16, inside wall portion 86c is erected rearward from front end edge 86b of outside wall portion 86a and its end edge 86g is positioned on the center side in the vehicle width direction of transmission air cleaner 72. Wind direction guide portion 86d is positioned slantwise above inside wall portion 86c (FIG. 16) and extends rearward toward between engine air cleaner 45 and transmission air cleaner 72 from before air intake port 73a of tip duct 73 (FIG. 17). Wind direction guide portion 86d guides a wind direction at the time of running to air intake port 45e of engine air cleaner 45.

As described above, forward cover 86 is fixed to right leg shield part 85 and front cover 88 with removable fastening parts. As shown in FIG. 18, when forward cover 86 is removed from right leg shield part 85 and front cover 88, transmission air cleaner 72 arranged inside forward cover 86 is exposed. Then, as shown in FIG. 8, when case cover 72b is removed from case body 72a, filter 72c is exposed and can be cleaned.

In this regard, as shown in FIG. 11, case cover 45b of engine air cleaner 45 is also exposed forward of the vehicle body between left and right leg shield parts 85, 87. As described above, case cover 45b is fixed to case body 45a with removable fastening parts, so that when these fastening parts are removed, as shown in FIG. 7, filter 45c is exposed forward.

As shown in FIG. 9, under cover 90 is fixed to front end edge 89a of engine front cover 89. As shown in FIG. 11, under cover 90 is arranged outward in the vehicle width direction of right leg shield part 85 and left leg shield part 87 and covers the bottom portion of air intake duct 71 from the front side.

As shown in FIG. 17, a forward cover 91 is arranged also at the front of left leg shield part 87. The shapes of forward covers 91 and 86 arranged at the front of right leg shield part 85 are bilaterally symmetric with respect to the center line in the vehicle width direction, and forward cover 91 includes wind direction guide portion 91d.

In motorcycle 1 described above, exterior cover 80 includes rearward cover 81 that covers main frame 22, extends outward in the vehicle width direction and covers the rear side of transmission air intake passage 70; and forward cover 86 that is curved forward from edge 85h outside in the vehicle width direction of right leg shield part 85 constructing rearward cover 81 and that covers transmission air intake passage 70 from the front side. Forward cover 86 thereby prevents sand or the like from entering from air intake port 73a of tip duct 73. Moreover, forward cover 86 is curved forward from edge 85h of right leg shield part 85 and covers transmission air intake passage 70 from the front side. Thus, forward cover 86 is supported on the front side of transmission air intake passage 70 by rearward cover 81, which prevents an increase in vehicle width.

Moreover, in motorcycle 1, forward cover 86 covers air intake port 73a of transmission air intake passage 70. Water, dust and the like are thereby prevented from entering from air intake port 73a.

Further, in motorcycle 1, air intake port 73a of transmission air intake passage 70 is open slantwise downward. Water, dust and the like are thereby prevented from entering air intake port 73a from above air intake port 73a.

Still further, air intake port 73a of transmission air intake passage 70 is open forward of the vehicle body, and forward cover 86 covers air intake port 73a of transmission air intake passage 70 from the front side. Water, dust and the like are thereby prevented from entering from air intake port 73a.

Still further, transmission air intake passage 70 has transmission air cleaner 72 disposed thereon that cleans air flowing through transmission air intake passage 70. Thus, it is possible to clean air to be sent into transmission case 38.

Still further, in motorcycle 1, rearward cover 81 passes on the rear side of transmission air cleaner 72 and extends outward in the width direction of the vehicle body, and forward cover 86 is curved forward from end edge 85h outside in the vehicle width direction of right leg shield part 85 constructing rearward cover 81 and covers the front side of transmission air cleaner 72. Transmission air cleaner 72 is thereby protected.

Still further, motorcycle 1 includes engine air cleaner 45 for cleaning air to be sent to engine 11. Air intake port 45e of engine air cleaner 45 is positioned on the center side in the vehicle width direction of transmission air intake passage 70, and forward cover 86 includes wind direction guide part 86b extended toward between transmission air intake passage 70 and engine air cleaner 45 from the front side of transmission air intake passage 70. Air thus can easily flow through air intake port 45e of engine air cleaner 45 can easily flow, and the efficiency of air intake by engine air cleaner 45 is enhanced.

Still further, motorcycle 1 includes engine air cleaner 45 for cleaning air to be sent to engine 11. Engine air cleaner 45 is arranged on the center side in the vehicle width direction of transmission air intake passage 70, and transmission air intake passage 70 is supported by engine air cleaner 45. The support structure of transmission air intake passage 70 is thereby simplified.

Still further, in motorcycle 1, transmission air intake passage 70 has transmission air cleaner 72 disposed thereon that cleans air flowing through transmission air intake passage 70. Transmission air cleaner 72 is supported by engine air cleaner 45. The support structure of two air cleaners is thereby simplified.

Still further, in motorcycle 1, transmission air intake passage 70 includes tip duct 73. Tip duct 73 is fixed to intake port 72d of transmission air cleaner 72 and takes in outside air at a position higher than intake port 72d and sends the outside air to transmission air cleaner 72. Air is thereby sucked from a higher position, which prevents water and the like from entering transmission air intake passage 70.

The present invention is not limited to motorcycle 1 as described above and can be variously modified. For example, rearward cover 81 covering main frame 22 and front shield 86 are assumed to be different parts, but they may instead be integrally formed.

The invention claimed is:

1. A straddle-type vehicle comprising:
   a cover arranged to cover a main frame, the main frame extending rearward from a front portion of a vehicle body;
   a transmission case housing a belt-type continuously variable transmission arranged in a lower portion of the vehicle body; and
   a transmission air intake passage extending upward from the transmission case and outward in a vehicle width direction of the main frame; wherein
   the cover includes:
      a rearward cover arranged to cover the main frame, the rearward cover extending outward in the vehicle width direction from the main frame to cover a rear side of the transmission air intake passage; and
      a forward cover connected to an outside edge of the rearward cover, the forward cover arranged to extend from the outside edge of the rearward cover toward a front side of the transmission air intake passage so as to cover an outer side of the transmission air intake passage, and to extend rearward and inward in the vehicle width direction from the front side of the transmission air intake passage so as to cover an inner side of the transmission air intake passage.

2. The straddle-type vehicle as claimed claim 1, wherein the forward cover is arranged to cover an air intake port of the transmission air intake passage.

3. The straddle-type vehicle as claimed claim 2, wherein an opening of the air intake port of the transmission air intake passage is slanted downward.

4. The straddle-type vehicle as claimed claim 2, wherein an opening of the air intake port of the transmission air intake passage faces forward, and the forward cover is arranged to cover a front of the air intake port of the transmission air intake passage.

5. The straddle-type vehicle as claimed claim 1, wherein the transmission air intake passage includes a transmission air cleaner arranged to clean air flowing through the transmission air intake passage.

6. The straddle-type vehicle as claimed claim 5, wherein the rearward cover extends in the vehicle width direction to cover a rear side of the transmission air cleaner.

7. The straddle-type vehicle as claimed claim 1, further comprising:
   an engine air cleaner arranged to clean air to be sent to an engine; wherein
   an air intake port of the engine air cleaner is positioned inside of the transmission air intake passage in the vehicle width direction; and
   the forward cover includes a wind direction guide arranged to extend between the transmission air intake passage and the engine air cleaner from the front side of the transmission air intake passage.

8. The straddle-type vehicle as claimed claim 1, further comprising:
   an engine air cleaner arranged to clean air to be sent to an engine; wherein
   the engine air cleaner is arranged inside of the transmission air intake passage in the vehicle width direction; and
   the transmission air intake passage is supported by the engine air cleaner.

9. The straddle-type vehicle as claimed claim 8, wherein the transmission air intake passage includes a transmission air cleaner arranged to clean air flowing through the transmission air intake passage and is supported by the engine air cleaner.

10. The straddle-type vehicle as claimed claim 9, wherein the transmission air intake passage includes a duct fixed to an intake port of the transmission air cleaner, the duct arranged to transmit outside air at a position higher than the intake port to the transmission air cleaner.

11. The straddle-type vehicle as claimed claim 1, wherein an inner edge of the forward cover in the vehicle width direction ends at the inner side of the transmission air intake passage.

* * * * *